Dec. 17, 1957 M. STENE 2,816,752
OSCILLATION DAMPENER
Filed Dec. 9, 1954 3 Sheets-Sheet 1
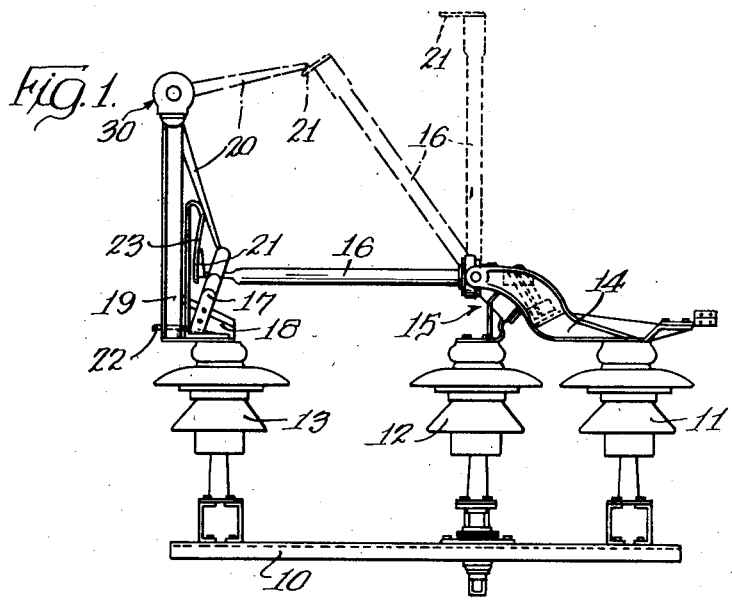
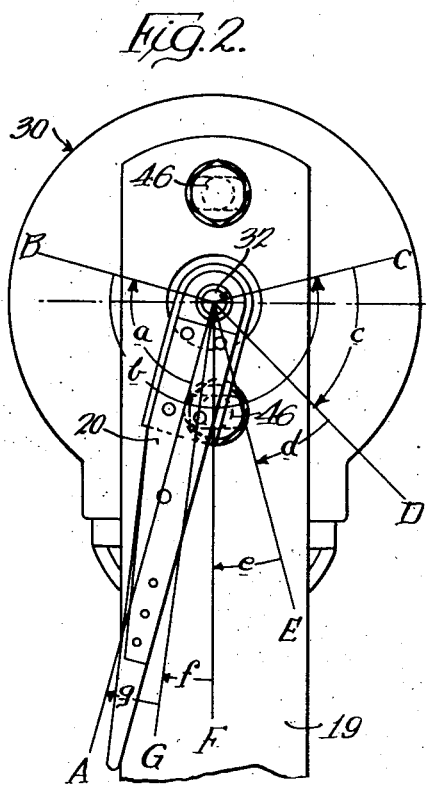
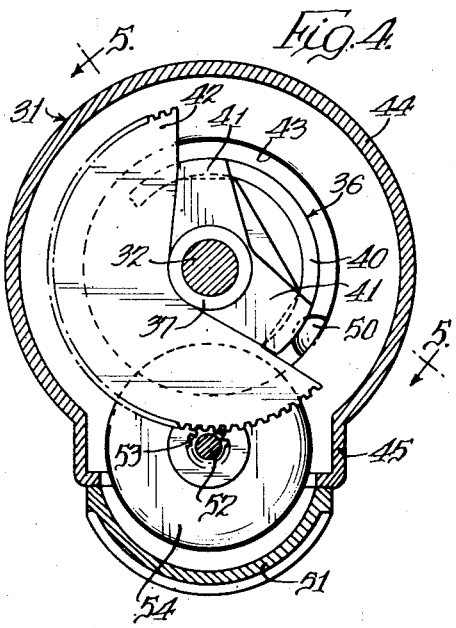
INVENTOR.
Manfred Stene
BY
Brown, Jackson, Boettcher & Dienner
Attys.

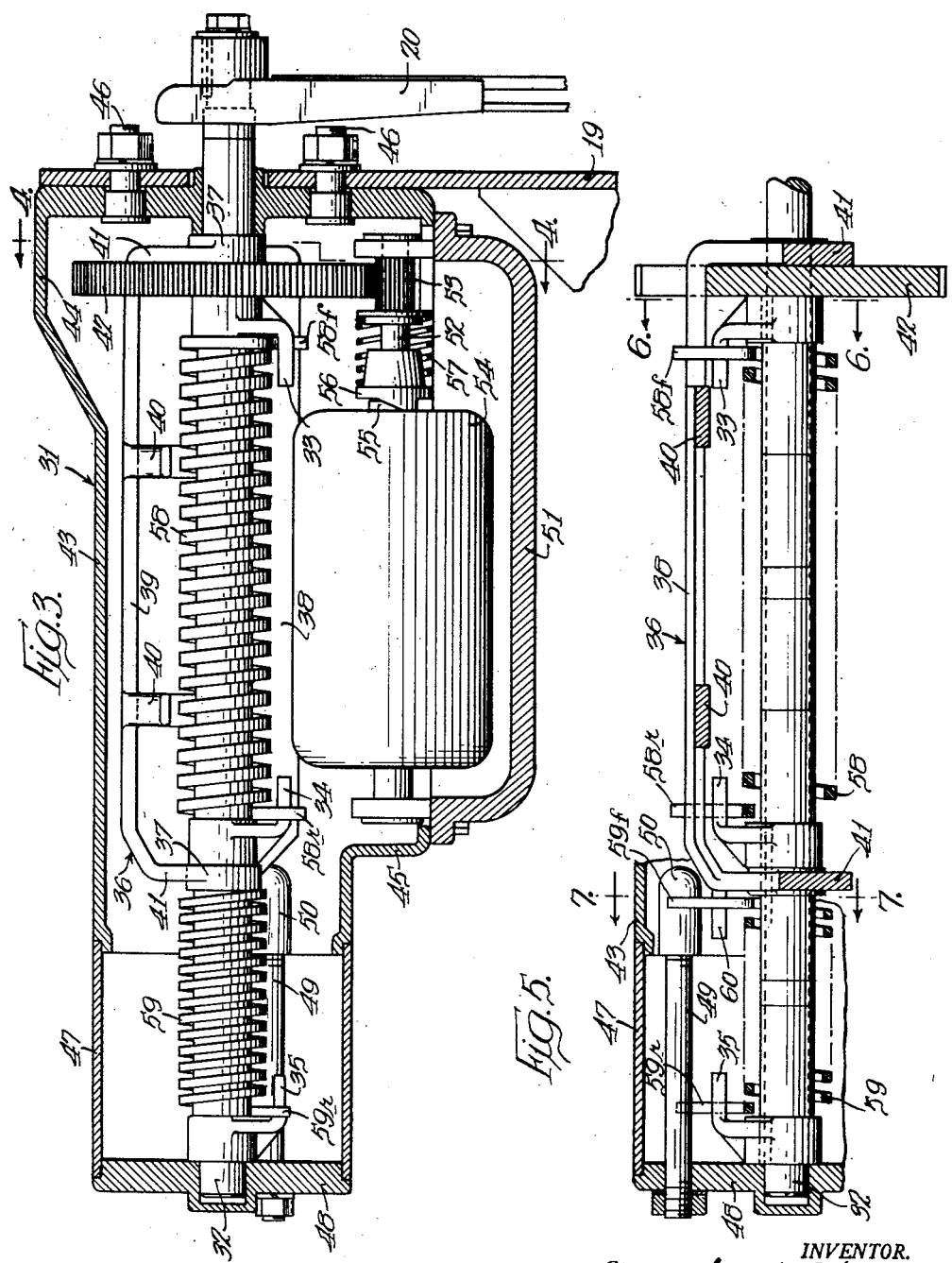

Dec. 17, 1957     M. STENE     2,816,752
OSCILLATION DAMPENER
Filed Dec. 9, 1954     3 Sheets-Sheet 3
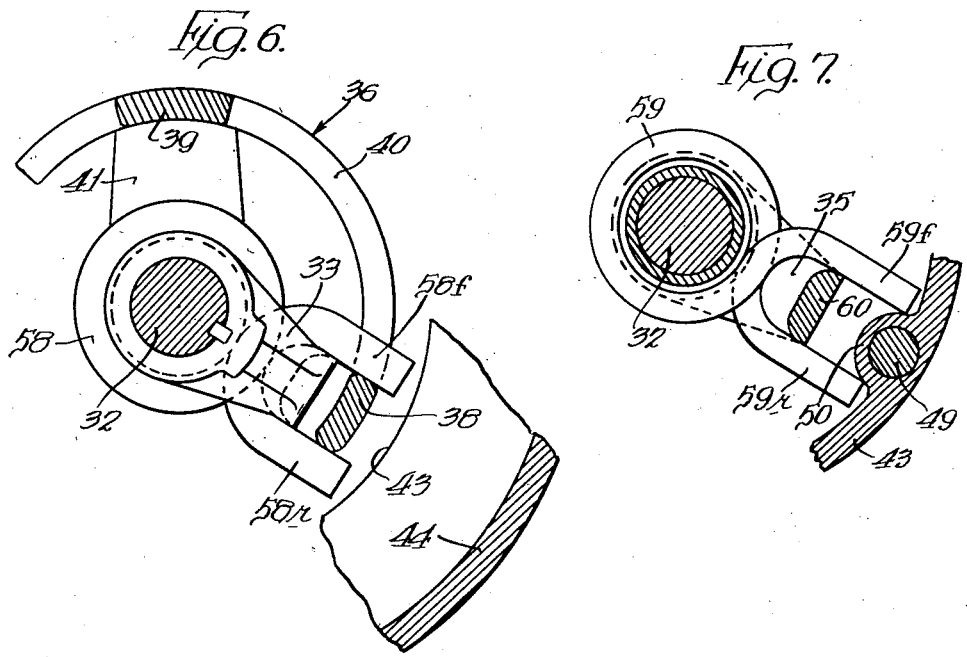
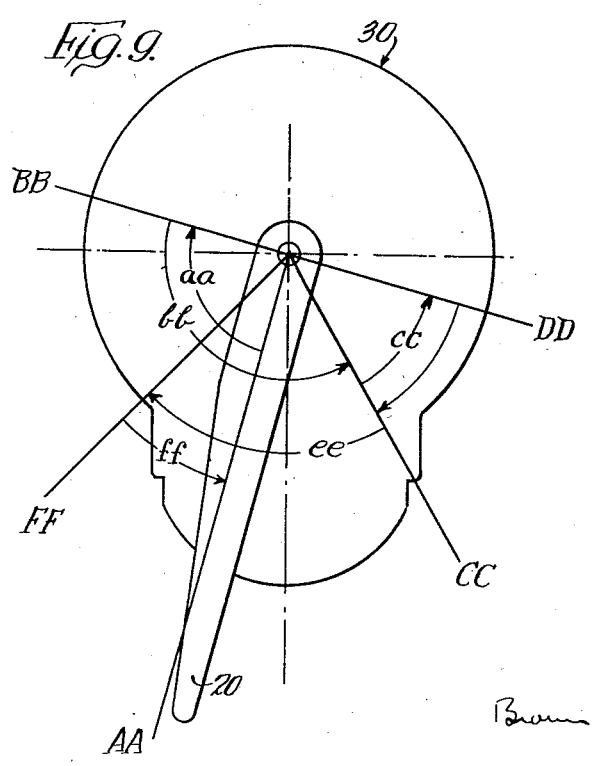
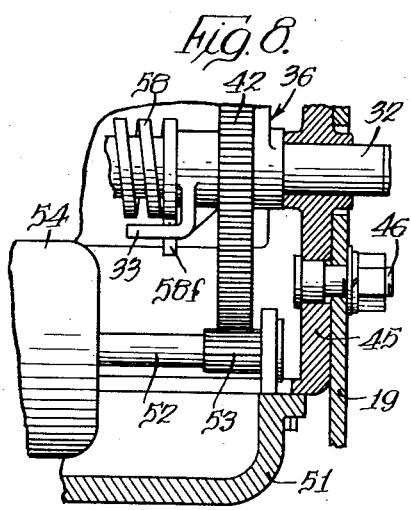
INVENTOR.
Manfred Stene United States Patent Office 2,816,752
Patented Dec. 17, 1957

2,816,752

OSCILLATION DAMPENER

Manfred Stene, Chicago, Ill., assignor to H. K. Porter Company, Inc. of Pittsburgh, Chicago, Ill., a corporation of Pennsylvania Application December 9, 1954, Serial No. 474,230

14 Claims. (Cl. 267—1)

The present invention relates to vibration and oscillation dampening and, particularly, to means for biasing an instrumentality normally subject to oscillation to a predetermined position of rest and for dampening the tendency of the instrumentality to oscillate in a pendulus manner upon being biased to such position.

In a variety of apparatus, certain instrumentalities are moved by others out of a normal position of rest and it is necessary in such apparatus to return the moved instrumentality to its original position as rapidly as possible, and also to mitigate the tendency of the instrumentality to vibrate or oscillate to opposite sides of its normal position upon being so returned. One such form of apparatus, including an oscillatable blade, is described in detail hereinafter by way of example. In this example, the requirements are made that the oscillatable instrumentality be of substantial length, be moved from a normal position through a substantial arc, be returned at very high speed through this arc, not be permitted to swing a substantial distance back into the original arc, and be brought to rest in its normal position as quickly as possible.

It is the object of the present invention to provide improved vibration dampening means, and particularly, to provide means for effecting the said return stroke of vibratable or oscillatable instrumentalities and for quickly bringing such instrumentalities to rest in a predetermined position without any, or with a minimum amount of, movement of the instrumentality back into the original path or arc of its movement.

More particularly, it is an object of the invention to provide means of the nature above stated for vibratable instrumentalities that attain such momentum and/or are formed of such materials as not to permit of their being damped simply by an abutment stop, either solid or resilient, and that would attain too great a degree of swing back into the original path or arc of movement if merely connected directly to a spring.

Another object of the invention is to provide means of the character defined including motivating means for effecting the return stroke of the vibratable instrumentality at high speed, and control or regulating means operable after completion of the return stroke to regulate the motivating means and to dissipate the momentum of the instrumentality.

Further, it is an object of the invention to provide means of the character defined including, as the motivating means, at least two springs tensioned in parallel upon movement of the vibratable instrumentality out of its position of rest to return the instrumentality to said position at maximum speed, and tensioned in series upon movement of the instrumentality beyond the position of rest in the opposite direction to minimize the force tending to swing the instrumentality beyond its position of rest in the original direction of movement of the instrumentality.

It is also an object of the invention to provide means of the character defined including, in combination with the two springs described above, a movable carriage operatively associating the two springs to accommodate tensioning of the same in series.

An additional object of the invention is to provide means of the character defined including spring means as above described, and including, as the regulating means, inertia mass means operatively associated with said spring means and operative in series with said spring means when said spring means is tensioned in series to dissipate, due to its inertia, the momentum of the instrumentality and to counteract what would otherwise be the normal action of the spring means, thus to mitigate vibration of the instrumentality.

A further object of the invention is the provision of means of the character defined including spring means and inertia mass or counterweight means as above described, and also including a one-way clutch between said means to accommodate operative association of said means only when the spring means is in the process of dissipating the energy resulting from series tensioning thereof to accommodate dissipation of the energy of the spring means and the momentum of the instrumentality as the instrumentality moves from its maximum position of overtravel, consequent upon its return stroke, towards its normal position, and to bring the instrumentality to rest in its normal position without reentry into its original path or arc of movement.

A still further object of the invention is the provision of means of the character above described including a movable carriage operatively associated with the said spring means and said counterweight means to accommodate series connection of said means and the two springs of said spring means and establishing, during vibration dampening, varying neutral positions of one of said springs.

In addition to the foregoing, it is an object of the invention to embody means of the character defined in a particularly serviceable, compact, practical and economical structure.

Other objects and advantages of the present invention will become apparent in the following detailed description of preferred embodiments of the invention.

While the preferred embodiments of the invention are described herein as effecting both actuation and dampening of oscillatory movement, it will be appreciated, as the description proceeds, that the disclosed apparatus, as well as the principles of the invention, may be employed with equal facility in conjunction with other types of vibratory movement, and that the same may likewise be employed for dampening functions alone.

Now, in order to acquaint those skilled in the art with the manner of making and using the vibration dampening means of my invention, I shall describe, in connection with the accompanying drawings, preferred embodiments of the invention and preferred manners of making the same.

In the drawings, wherein like reference numerals indicate like parts:

Figure 1 is a side elevation of apparatus incorporating the actuating and/or dampening means of my invention, the apparatus shown, by way of example, comprising electrical switch gear including an oscillatable blade;

Figure 2 is a side view, taken from the opposite side of the apparatus, of the oscillatable blade with which the means of the invention is associated, the view showing the housing of said means in end elevation and including a schematic representation of the movement to which the instrumentality is limited by the embodiment of said means disclosed in Figures 3 to 7;

Figure 3 is a longitudinal vertical section, on an enlarge scale, of a preferred embodiment of the vibration dampener of the invention;

Figure 4 is a cross sectional view of the preferred embodiment of the dampener, the view being taken substantailly on 4—4 of Figure 3;

Figure 5 is a fragmentary sectional view taken substantially on 5—5 of Figure 4;

Figure 6 is a cross sectional view taken substantially on 6—6 of Figure 5;

Figure 7 is a cross sectional view taken substantially on line 7—7 of Figure 5;

Figure 8 is a fragmentary side view of a modified manner of operatively connecting the carriage and counterweight of the means of the invention, the view showing the practical structural dicerence between the preferred embodiment of the invention and a second embodiment; and Figure 9 is a schematic representation of the movement to which an oscillatable instrumentality is limited by the said second embodiment of the means of the invention.

Referring now to the drawings and particularly to Figure 1, I have shown therein one type of apparatus, comprising a high capacity electrical switch, to which the present invention is particularly applicable. In high capacity electrical systems, up to 161 kilovolts, for example, handling up to several hundred amperes of current, two general types of air break switches are employed, namely, disconnecting switches for isolating various pieces of equipment and interrupting switches for interrupting current flow and initially breaking the circuit. A well known form of disconnecting switch is described in detail in the United States patent to T. Fjellstedt and S. C. Killian, No. 2,527,924, issued October 31, 1950. This switch is shown in Figure 1 as comprising a base 10 carrying three insulator stacks 11, 12 and 13, the center one 12 of which is rotatable. The right hand stationary stack 11 carries a frame 14 and associated with this frame and the rotatable insulator 12 are the operating mechanism 15 and movable blade 16 of the switch. Due to the structure and operative assembly of the components, as is more fully understood from the patent referred to above, the blade 16 is simultaneously moved in an arc of approximately 90 degrees and rotated approximately 90 degrees about its own axis, between the positions shown in solid and dotted lines, upon rotation of the insulator 12 to dispose the blade in open position (dotted lines) and closed position (solid lines). In the closed position, the blade 16 makes high pressure contact with a stationary contact 17 mounted on top of the left hand stationary insulator 13 to close the circuit. However, for reasons will known in the switch art, this switch cannot effectively interrupt flow of current, particularly in the capacities to be encountered. For present purposes, it may be stated that the inability of the switch described to interrupt current flow is principally that the blade 16 cannot be moved fast enough to break the current carrying arc that strikes between the stationary contact and the blade immediately upon commencement of physical separation of the two.

To impart to disconnecting switches of this character a current interrupting function, it has been proposed to incorporate a high speed interrupter blade in the switch structure. Specifically, in the apparatus shown in Figure 1, a bracket 18, electrically connected to the contact 17, is mounted on the insulator stack 13, and this bracket mounts an angle iron upright 19. The interrupter switch blade, indicated at 20, is pivotally mounted at the upper end of the upright 19 and normally extends downwardly to a position adjacent the contact 17. At its outer end, the main switch blade 16 carries a hook 21 which is disposed to engage and pick up the interrupter blade 20 upon opening movement of the blade 16 with respect to the contact 17. Thus, current flow follows the electrically conductive path of the main blade 16, the interrupter blade 20, and the supporting members 19 and 18 to the terminal pad 22 of the contact 17. To prevent arcing during transfer of the current load from the contact 17 to the blade 20, and also during closing movement of the main switch blade 16, the switch preferably includes an arcing horn 23 engageable by the main blade 16 and connected to the contact 17. Accordingly, as the main blade 16 is moved from its closed position to its open position, it initially engages and causes the interruper blade 20 to move with it without interruption of current flow and without any disconnection. The blade 20 is of such length in relation to its mounting and the arcuate path of movement of the main blade 16 as to be carried upwardly with the main blade to the position, indicated in dot dash lines, wherein the main blade 16 is sufficiently removed from the stationary contact 17 to prevent arcing between the two and to accommodate high speed current interrupting return movement of the blade 20. By utilizing the movement of the blade 20 as caused by the main blade 16 to load actuating or motivating means such as a torsion spring, the blade 20 may be returned toward the contact 17 with sufficient speed to break the arc that strikes between the blades 16 and 20 when the hook 21 releases the blade 20.

In this latter connection, it is to be observed that the main blade 16 and contact 17 are of substantial section to carry a high amperage load for substantial periods of time, with the general result that the blade is relatively heavy and cannot be operated too quickly within the meaning of the art. Because of its relatively slow movement away from the contact 17, the main blade 16 would permit the arc to elongate as the gap is opened between the blade and contact without breaking the arc. On the other hand, the interrupter blade need only carry current for very short intervals and may be made of lighter materials and of less section so as to accommodate high speed actuation thereof, whereby the same is adapted to be moved away from the main blade at such speed as to break the arc, to interrupt current flow. By utilizing torsion spring means operatively associated with the interrupter blade 20 to be tensioned upon movement of the blade 20 by the main blade 16, sufficient speed can be imparted to the blade 20 to interrupt substantial current loads. In addition, the torsion spring means and/or other motivating means will have a neutral position centering the blade 20 as shown in solid lines adjacent the contact 17, resiliently to support the blade 20 in such position, so as to accommodate reclosing of the switch and so as to be operative upon the next opening of the main switch blade. As will be appreciated by those skilled in the art, this interrupting device is in no way limited to the particular disconnecting switch structure disclosed and may be applied with equal facility to other air break switches, whether the disconnecting switch be of a vertical break type, as shown, or a horizontal break type.

In view of the fact that the motivating means for the interrupter blade 20 must be energized to a substantial extent in order to effect the high speed return movement of the blade 20, it is to be appreciated that the motivating means will impart such momentum to the blade 20 that the same will tend to swing rapidly past its normal position to load or energize the motivating means in the opposite direction or on the opposite hand, thus to tend to oscillate the blade in a pendulus manner to opposite sides of the normal position of the blade. As will be further appreciated, the magnitude of at least the initial oscillations of the blade would be so large as to carry the blade 20 to positions sufficiently colse to the main blade 16 as to permit of restriking the arc, even though the blade 16 continues to move toward its full open position, thus to negative the purpose of current interruption. Accordingly, it is necessary to damp the blade 20 to prevent such disadvantageous oscillation or vibration. It is the specifiobject of the present invention to provide means for dampening the oscillations of blade 20, particularly in high capacity switch structures.

A preferred embodiment of the invention is indicated generally in Figures 1 and 2 at 30, the apparatus or device being of relatively small size and mounted directly on the supporting upright 19 adjacent the top thereof. The blade actuating and dampening means 30, as shown in detail in Figures 3 to 7, includes a housing 31 and a main shaft 32 journalled in the housing and having a portion thereof extending to the exterior of the housing upon which the interrupter blade 20 is mounted for pivotal or oscillatory movement with the shaft. The shaft 32, within the interior of the housing 31, carries three longitudinally spaced radially extending fingers 33, 34 and 35, each of which comprises a hub keyed or otherwise secured to or made integral wtih the shaft, a radially extending portion and an end portion extending longitudinally of the shaft. The first finger 33 is spaced inwardly from the wall of the housing through which the shaft extends and has the end portion thereof projecting toward the center of the housing; the second finger 34 is disposed oppositely of the first and is spaced a substantial distance along the shaft from the first finger; the third finger 35 is disposed in the same manner as the second adjacent the opposite end of the housing at a longitudinal spacing from the second finger preferably less than that between the first and second fingers; and all three fingers are preferably aligned longitudinally of the shaft. Rotatably moutned on the shaft 32 to encompass the first and second fingers 33 and 34 is a generally semi-cylindrical carriage 36 having hub portions 37 journalled on the shaft adjacent, forwardly and rearwardly of, respectively, the fingers 33 and 34. The carriage may suitably comprise a pair of circumferentially spaced longitudinal beams 38 and 39 and arcuate ties 40 joining the beams, the beams being connected to the hubs 37 by radial arms 41. Also journalled on the shaft 32 is a gear segment 42 having a diameter greater than that of the carriage, the segment being journalled on the shaft between the finger 33 and the forward end of the carriage and having a cut-away portion exactly accommodating passage of the beams 38 and 39, whereby the carriage and the gear are connected together for conjoint rotation on the shaft 32.

The housing 31 includes a parti-cylindrical main portion 43 having a bell-like forward end portion 44 accommodating the gear 42, and a downwardly extending and downwardly open portion 45, the main portion 43 being open at its rearward end. On the forward wall thereof, the wall through which the shaft 32 extends, the housing portion 43 carries a pair of studs 46 accommodating mounting of the housing on the upright support 19. The rearward end of the housing is formed by a cylindrical extension 47 and an end cap 48 which is secured to the main portion of the housing by means of studs 49 threaded into bosses 50 in the main portion 43, the end plate 48 affording a bearing for the rearward end of the shaft 32. The downwardly open portion 45 of the housing is closed by means of a semi-cylindrical closure 51 which is bolted at its corners to the lower surface of the portion 45. A pair of bearings are fixedly mounted on the upper surface of the closure 51 to be received within the interior of the housing rotatably to support therein, in spaced parallel relation to the main shaft 32, a counterweight shaft 52.

The counterweight shaft 52 is provided adjacent its forward end with a pinion 53, fixed to or formed integrally therewith, and meshing with the segmental gear 42. The shaft 52, rearwardly of the pinion, carries a counterweight or mass 54, preferably cylindrical in form, having substantial inertia. In the preferred embodiment of the invention, as shown in Figure 3 particularly, the counterweight is rotatably mounted on the shaft 52 and is adapted to be connected to the pinion 53 for rotation with the pinion and shaft by means of a one-way clutch comprising projections 55 on the forward face of the weight, a clutch element 56 having corresponding projections and a spring 57 biasing the clutch element into engagement with the forward face of the counterweight. In a second embodiment of the invention, which is otherwise the same as the preferred embodiment, the counterweight 54 is fixedly mounted on the shaft 52 for conjoint rotation therewith, and the one-way clutch 55, 56, 57 is omitted, as is shown in Figure 8.

As is to be appreciated from the foregoing, the apparatus or device of the invention requires motivating means for the shaft 32 and interrupter blade 20 and such means is preferably provided according to the invention in the form of a pair of torsion springs 58 and 59. Both springs are preferably formed of square spring wire stock of particularly great strength and are helically wound to afford a rapid loading characteristic. The spring 58 is preferably of a length greater, and is preferably stronger, than the spring 59, but both springs are wound in the same manner to define upwardly extending ends normally offset from one another in one direction and relatively movable in the other direction to define a prestressed condition of the springs wherein the ends define a U when viewed longitudinally of the springs. Both springs are slipped over the shaft 32 freely to encircle the same, with the first spring 58 being located between the two fingers 33 and 34 and with the second spring 59 located between the rearward end of the carriage 36 and the third finger 35.

The second spring 59 is mounted in the housing extension 47 with the opposite ends thereof effectively engaging opposite sides of one of the studs 49 to retain the spring in its prestressed condition. Specifically, as is to be seen particularly in Figure 7, one of the studs 49 and one of the bosses 50 are located in the lower right-hand quadrant of the housing, and it is this stud and boss upon which the spring 59 is centered, the forward end 59f of the spring 59 engaging the upper surface of the boss 50, and the rearward end 59r of the spring engaging the lower surface of the stud 49. The effect of the springs 58 and 59, as will be apparent as the description proceeds, is to center the shaft 32 and carriage 36 in the housing with the fingers 33, 34 and 35 of the shaft and the beam 38 of the carriage aligned radially of the shaft with the said one stud 49 and boss 50. In such position, the rearward end 59r of the smaller spring 59 engages the lower surface of the shaft finger 35, and the forward end 59f of the spring 59 engages the upper surface of a longitudinal projection 60 formed on the rearward end of the carriage 36 in longitudinal alignment with the beam 38.

The first torsion spring 58, as shown in Figure 6, is similarly mounted with the rearward end 58r thereof engaging, as shown, the lower surfaces of the shaft finger 34 and the carriage beam 38, and the forward end 58f thereof engaging the upper surfaces of the shaft finger 33 and the carriage beam 38. Both ends of the springs 58 are entirely free of the housing.

As is to be observed particularly from Figure 4, the counterweight 54 is disposed in the path of rotation of the carriage 36 in the space between the longitudinal edges of the semi-cylinder thereof so as to limit movement of the carriage in opposite directions about the shaft 32. In the normal position of the components, as shown in the drawings, the lower beam 38 of the carriage normally engages the counterweight 54 so as to prevent rotation of the carriage in the clockwise direction as viewed in the end-elevation and cross-sectional views of Figures 2, 4, 6 and 7.

Structurally, the preferred embodiments of the invention are as above described and the operation is then as follows: In the light of the description of Figure 1, but viewing the interrupter blade 20 as shown in Figure 2, it is to be appreciated that the blade 20 is first moved in a clockwise direction by the main switch blade 16, specifically, from the normal position indicated at A in Figure 2 to the position at which the main blade 16 releases the blade 20, as is indicated at B in Figure 2. As this movement occurs, the shaft 32 and its fingers 33, 34 and 35 are also moved in a clockwise direction causing the fingers 34 and 35 to engage and move the ends 58r and 59r of the torsion springs 58 and 59. The opposite end 59f of the spring 59 is held against rotation in the said clockwise direction by the boss 50 in the housing, so that the spring 59 is thus wound and tensioned in one direction or on one hand. Likewise, the end 58f of the spring 58 is held against movement in the clockwise direction by the beam 38 of the carriage 36, which is held against clockwise movement due to its engagement with the coutnerweight 54, so that the spring 58 is also wound and tensioned on the said one hand. The springs 58 and 59 are thus wound separately in the clockwise direction so that the springs may be said to be wound in parallel. Due to the manner of tensioning of the springs upon rotation of the shaft 32 in the clockwise direction from the normal position A, both springs are energized to a maximum extent, thus to exert a combined motivating force in a return direction on the shaft 32 and blade 20. As the main switch blade 16 releases the blade 20 at position B, this combined spring force acts to return the blade at sufficiently high speed toward the original or normal position A as to break any arc that may strike between the blades upon initial separation thereof. When the blade and shaft reach their original positions, the shaft and its fingers and the springs 58 and 59 are returned to their original positions as previously described.

As the interrupter blade 20 is moved rapidly by the springs 58 and 59 from position B to position A, the blade attains such substantial momentum as to be carried beyond the normal position A in a counterclockwise direction, whereupon the shaft will tend to tension the springs in the opposite direction or on the other hand. Specifically, upon initial counterclockwise movement from position A, the finger 33 on the shaft 32 engages the forward end 58f of the spring 58, the rearward end 58r of the spring 58 engages the beam 38 of the carriage 36, the finger 60 on the rearward end of the carriage 36 engages the forward end 59f of the spring 59, and the opposite end 59r of the spring 59 engages the fixed or stationary stud 49. Since the spring 59 is preferably weaker than the spring 58, the counterclockwise movement of the shaft 32 from position A will at least initially result in counterclockwise rotation of the carriage 36 to wind or tension the spring 59 in the direction or on the hand opposite the original tensioning thereof. In both directions, or on both hands, the springs are tightened or compressed with respect to the shaft to obtain maximum benefit from the springs. If the spring 59 is substantially weaker than the spring 58, the spring 59 will be first tensioned on the said other hand within the limits of rotary movement of the carriage 36 defined as a consequence of disposition of the counterweight 14 in the path of rotation of the beam 38. Thereafter, the spring 58 will be tensioned on the said other hand, so that the two springs will be tensioned in series due to the intermediary of the carriage. If the spring 59 is not substantially weaker than the spring 58, the two springs will be tensioned on the said other hand in successive alternate stages, but still in series.

With respect to the embodiment of the invention shown in Figures 2 to 7, it is to be observed that the counterweight 54 is connected to the shaft and the housing through the springs 58 and 59, carriage 36, gear 42, pinion 53 and one-way clutch 55, 56, 57. Due to this structural arrangement, the shaft 52 and pinion 53 can be rotated only when the carriage 36 is rotated, so that the said parts are operative only subsequently to passage of the blade 20 and shaft 32 past position A from position B.

Further, in this specific embodiment, the one-way clutch accommodates operative association of the mass and carriage only when the carriage moves in a clockwise direction. Accordingly, the entire momentum imparted to the blade and shaft during movement from position B to position A must be absorbed by the springs 58 and 59 in series. Since the spring characteristic is weaker in series than in parallel, the blade swings a substantial distance beyond position A approximately to the position C shown in Figure 2. As the blade is brought to a stop in or about position C, the springs 58 and 59, as tensioned in series, commence to return the blade toward position A. As this returning movement occurs, the spring 59 tends to effect clockwise movement of the carriage 36, and as this latter movement commences, the inertia mass is connected to the carriage and the springs by the one-way clutch to retard or regulate the release or deenergization of at least the spring 59. Because of this action, the blade in being returned toward position A from position C is subjected intermittently to abrupt reduction in speed as the mass dissipates the energy of the springs 58 and 59.

Specifically, the blade 20 will commence to return fairly rapidly from position C toward position A until the mass 54 comes into operative connection with the carriage abruptly to reduce the speed of the shaft and blade at about position D. When the mass overruns the one-way clutch, the carriage, springs, shaft and blade are again released to re-commence the clockwise movement of the blade and shaft. At this point, the springs have been released considerably from their original condition of tension on the said other hand. However, the springs still impart sufficient energy to the carriage and the shaft to cause the carriage and blade to accelerate and catch up to the now decelerating mass 54, whereupon the clutch 55, 56, 57 again connects the mass to the carriage to again retard or regulate the release of the springs, whereupon the blade abruptly decreases in speed at about position E. This same action occurs also at points F and G, for example, and each time the blade is made to hesitate by the inertia mass, the springs have been still further released, so that by the time the blade reaches position G, the springs 58 and 59 are no longer sufficiently tensioned to do other than to center the blade and carriage on the housing stud 49. Stated in another manner, the effect of the inertia mass 54 is to retard release of the spring 59, thus to establish varying neutral positions for the spring 58, by causing the carriage 36, upon which the spring 58 is centered, to hesitate in a number of positions. The end effect of such dampening action is that the blade is brought to rest in its normal position A without reentry into its original arc of movement from A to B, thus to eliminate entirely the possibility of restriking an electrical arc between the blades 16 and 20. As long as the mass 54 has sufficient inertia to dissipate the energy of the springs, the described action will occur. If desired, of course, variations may be made in the described dampening action by suitable variations in the relationship of mass to spring force to momentum.

In a specific structure of the above described embodiment of the invention as associated with the switch blade of the character described, I have utilized a normal blade position of approximately 15 degrees forwardly of the vertical upright 19, and have accommodated approximately a 90 degree swing of the blade through angle a from position A to position B. In this structure, the return swing of the blade through the angle b, from position B to position C, has been approximately 210 degrees and dampening has occurred in exactly the manner described, with the blade moving through an arc c of approximately 60 degrees from position C to position D, then hesitating momentarily, thereafter moving through an arc d of approximately 30 degrees from position D to position E, hesitating at E and moving through an arc e of approximately 15 degrees from E to F, again hesitating and moving through an arc f of approximately 7½ degrees to G, hesitating again, and finally moving through the arc g of 7½ degrees to a position of complete rest at the normal position A. Despite the description required to explain the action involved, the entirety of the dampening action occurs very rapidly, and the ultimate is attained in mitigation of blade oscillation for the purpose described.

In contrast to the foregoing, the embodiment of the invention shown in Figure 8 omits the one-way clutch above described and incorporates a direct gear drive between the mass or counterweight 54 and the carriage 36. Due to this drive connection, the counterweight comes into effective operation as soon as movement of the blade and shaft due to momentum past the normal position in a counterclockwise direction occurs. The result of this, as will be appreciated, is a substantially different dampening action. Specifically, with apparatus constructed exactly as in the specific structure of the embodiment of the invention above described, with the exception noted with respect to the connection of the mass and the carriage, the device afforded the damping characteristics schematically represented in Figure 9. As there shown, the blade has a normal position AA approximately 15 degrees forwardly of the vertical upright and is swung through an angle aa of approximately 90 degrees by the main switch blade to position BB. The torsion springs as tensioned on the one hand in parallel return the blade rapidly to position AA, and momentum carries the blade beyond this position to commence series tensioning of the springs on the other hand. Upon initial movement of the blade past position AA, the mass 54 apparently retains the carriage 36 against movement and the spring 58 is initially tensioned on said other hand to at least a certain extent. At approximately position CC, the momentum of the blade and the degree of tensioning of the spring 58 apparently necessitate movement of the carriage 36 and thus of the mass 54. The inertia of the mass causes the blade and the shaft 32 to hesitate momentarily at position CC, after being moved through an arc bb of approximately 135 degrees from position BB, but the inertia of the mass is not adequate to dissipate entirely the momentum of the blade. After said hesitation, the blade continues its counterclockwise swing through an arc cc of approximately 45 degrees to position DD. In moving to position DD, the remaining momentum of the blade is dissipated in part by series tensioning of the springs and in part by driving the inertia mass. If the carriage 36 engages the mass 54 before the momentum of the blade is dissipated, the momentum of the mass is dissipated through the supporting structure and does not affect blade movement. However, if the carriage 36 is not stopped by engagement with the mass prior to dissipation of the momentum of the blade, the momentum of the mass before the carriage reaches said position may result in tensioning of the spring 59 to an extent slightly greater than would otherwise be the case. In any event, the blade is stopped at about position DD and then commences its return movement toward position AA upon series release of the springs. As the blade again approaches said position CC, the spring 59 commences to drive the carriage 36, whereupon the mass 54 again exerts an influence on the spring system to cause an abrupt reduction in the speed of the blade at position CC. After this hesitation, or abrupt reduction in the speed of the blade, the blade swings through a clockwise arc ee of approximately 75 degrees to position FF, which is back into the original arc aa of movement, whereafter the blade walks back to its original or normal position AA. Again, the action occurs rapidly, and even though the blade swings approximately 30 degrees back into its original arc aa of movement, this is not entirely disadvantageous and may be quite satisfactory for a variety of installations.

As will be appreciated, of course, the embodiment of the invention disclosed in Figures 2 to 7 is preferred over the embodiment of Figure 8, at least in solution of the particular problem herein described, because of its more advantageous dampening action. In addition, the former embodiment is preferred over the latter for the reason that the one-way clutch serves to alleviate exceedingly high stresses and bearing pressures that are encountered in the Figure 8 embodiment of the device. Since in the Figure 8 embodiment, the counterweight becomes effective immediately upon completion of the most powerful stroke of the device, while the blade has its greatest momentum, the stresses imposed upon the shaft 32, carriage 36, gear 42, pinion 53 and shaft 52 are very great and the pressures encountered in the shaft bearings are very high. In the preferred embodiment, the counterweight becomes effective shortly after the blade has been stopped at position C in Figure 2 so that the momentum is very substantially less, whereupon the stresses and bearing pressures exerted on the device are very much smaller.

Due to the fact that the two motivating springs 58 and 59 are initially tensioned in parallel, the current interrupting movement of the blade 20 toward its normal position is effected with great speed, as is desired. On the other hand, since the momentum of the blade 20 is dissipated at least in part by tensioning of the springs 58 and 59 in series, the returning movement of the blade by the series tensioned springs back toward the normal position A cannot be effected with as great speed, and the parallel tensioning of the springs to the forward side of position A will more quickly absorb the returning momentum of the blade, thus to assist in mitigation of oscillation of the blade back into its original arc of movement. Accordingly, the provision of two torsion springs and the particular association of the same, by means of the fingers 33, 34 and 35 and the carriage 36, to be wound in parallel on the one hand and in series on the other hand, affords substantial advantages in mitigating oscillation of the blade back into its original arc, A to B, thus to mitigate the possibility of restriking an electrical arc between the blades 16 and 20.

In consideration of the foregoing description of the device of the invention, and particularly in consideration of the applicability of the principles of the invention to the dampening of other forms of vibratory movement, it is to be appreciated that the shaft 32 is exemplary of a member movable between two end positions and having a position of rest intermediate the end positions, the member being subject to vibration about its position of rest due to its momentum. The torsion springs likewise are exemplary of motivating means for normally biasing the movable member to its position of rest and energizable on opposite hands upon movement of the member in opposite directions to motivate the member to its normal position from end positions on opposite sides of the normal position. The inertia mass is exemplary of retarding or regulating means operatively associated with the motivating means and the movable member for regulating or retarding at least deenergization, and in the embodiment of Figure 8 both energization and deenergization of the motivating means and/or mitigating or dissipating the momentum of the movable member during energization of the motivating means on one hand. The carriage too is exemplary of clutch means operatively connecting the motivating means or movable member to the retarding or regulating means to connect the same only upon or subsequent to movement of the movable member to one side of its normal position.

In the light of these observations, and the foregoing detailed description, it is to be appreciated that the present invention affords highly practical and economical means for normally retaining a movable member in a given position, for returning the member toward such position at high speed, for dampening the member to mitigate vibration of the member to opposite sides of its normal position for mitigating return of the member into its original path of movement and for bringing the member to rest in its normal position as rapidly as possible.

While I have described what I regard to be preferred embodiments of my invention, it will be appreciated that various changes, rearrangements and modifications may be made therein without departing from the scope of the invention, as defined by the appended claims.

I claim:

1. Means of the character defined comprising mounting means, a member movably mounted on said mounting means for movement between two end positions, resilient means operatively engaging said member and said mounting means, said resilient means normally biasing said member in a normal position on said mounting means intermediate said end positions, said member, due to its operative engagement with said resilient means, upon movement from its normal position toward one end position energizing said resilient means on one hand and upon movement from its normal position toward its other end position energizing said resilient means on the other hand, means mounted on said mounting means for retarding at least deenergization of said resilient means on said other hand, and drive means extending operatively between said retarding means and said resilient means for preventing operative connection of said retarding means and said resilient means during energization and deenergization of said resilient means on said one hand and for operatively connecting said retarding means and said resilient means during at least deenergization of said resilient means on said other hand, said resilient means upon deenergization on said one hand exerting an unregulated returning force on said member and imparting substantial momentum thereto whereupon said member moves beyond its normal position toward said other end position, said retarding means retarding at least deenergization of said resilient means on said other hand to mitigate against attainment of substantial returning momentum by said member thus to mitigate the tendency of said member to move back beyond its normal position toward said one end position and to vibrate to opposite sides of its normal position.

2. Means of the character defined comprising mounting means, a member movably mounted on said mounting means for movement between two end positions, resilient means operatively engaging said member and said mounting means, said resilient means normally biasing said member to a normal position on said mounting means intermediate said end positions, said member, due to its engagement with said resilient means, upon movement from its normal position toward one end position energizing said resilient means on one hand and upon movement from its normal position toward its other end position energizing said resilient means on the other hand, means mounted on said mounting means for retarding deenergization of said resilient means on said other hand, and drive means operatively connecting said retarding means to said resilient means solely during movement of said member from said other end position toward said normal position, said resilient means upon deenergization on said one hand exerting an unregulated returning force on said member and imparting substantial momentum thereto whereupon said member moves beyond its normal position toward said other end position and energizes said resilient means on the other hand, whereupon said resilient means exerts an opposite returning force on said member, said retarding means retarding only deenergization of said resilient means on said other hand to mitigate against attainment of substantial momentum by said member in its movement from said other end position toward its normal position to prevent movement of said member back beyond its normal position toward said one end position.

3. Means of the character defined comprising mounting means, a member movably mounted on said mounting means for movement between two end positions, resilient means operatively engaging said member and said mounting means, said resilient means normally biasing said member to a normal position on said mounting means intermediate said end positions, said member, due to its operative engagement with said resilient means, upon movement from its normal position toward one end position energizing said resilient means on one hand and upon movement from its normal position toward its other end position energizing said resilient means on the other hand, means mounted on said mounting means for retarding energization and deenergization of said resilient means on said other hand, and drive means operatively connecting said retarding means to said resilient means solely, but throughout the full path of, movement of said member between its normal position and said other end position, said resilient means upon deenergization on said one hand exerting an unregulated returning force on said member and imparting substantial momentum thereto whereupon said member moves beyond its normal position toward said other end position, said retarding means retarding both energization and deenergization of said resilient means on said other hand to assist said resilient means in dissipating the momentum of said member and to mitigate against attainment of substantial momentum by said member during its movement from said normal position to said other end position and back, thus to mitigate the tendency of said member to move back beyond its normal position toward said one end position and to vibrate to opposite sides of its normal position.

4. Means of the character defined comprising a support, a shaft rotably mounted on said support for oscillation between two end positions, resilient means operatively engaging said shaft and said support and biasing said shaft to a normal position on said support intermediate said end positions, said shaft, due to its engagement with said resilient means, upon rotation from its normal position toward one end position energizing said resilient means on one hand and upon rotation from its normal position toward its other end position energizing said resilient means on the other hand, means mounted on said support for retarding at least deenergization of said resilient means on said other hand, and drive means extending operatively between said retarding means and said resilient means for preventing operative connection of said retarding means and said resilient means during energization and deenergization of said resilient means on said one hand and for operatively connecting said retarding means and said resilient means during at least deenergization of said resilient means on said other hand, said resilient means upon deenergization on said one hand exerting an unregulated returning force on said shaft and imparting substantial momentum thereto whereupon said shaft rotates beyond its normal position toward said other end position, said retarding means retarding at least deenergization of said resilient means on said other hand to mitigate against attainment of substantial momentum by said shaft thus to mitigate the tendency of said shaft to rotate back beyond its normal position toward said one end position and to oscillate to opposite sides of its normal position.

5. Means of the character defined comprising mounting means, a member movably mounted on said mounting means for movement between two end positions, at least two springs acting on said member, at least one of said springs engaging said mounting means and biasing said member to a normal position on said mounting means intermediate said end positions, said member including means operatively associated with one of said springs and operatively connecting said member to said one spring upon movement of said member toward either of its end positions from said normal position, said member including second means engageable with the other of said springs only upon movement of said member from said normal position toward one of said end positions, whereby said member, upon movement from said normal position toward said one end position, acts individually on each of said springs to tension said springs on one hand in parallel, and means for connecting said one spring to said other spring upon movement of said member from said normal position toward the other of said end positions, whereby said member, upon movement from said normal position toward said other end position, acts on the other hand on said one spring and said one spring acts in turn on said other spring to tension said springs on the other hand in series.

6. Means of the character defined comprising mounting means, a member movably mounted on said mounting means for movement between two end positions, at least two springs acting on said member, one of said springs engaging said mounting means and biasing said member to a normal position on said mounting means intermediate said end positions, said member upon movement from its normal position toward one end position acting individually on each of said springs to tension said springs on one hand in parallel, said member upon movement from its normal position toward its other end position acting on the other hand on one of said springs, means connecting said one spring to the other spring upon movement of said member from said normal position toward said other end position, whereby said member in its latter movement tensions said springs on the other hand in series, means mounted on said mounting means for retarding at least deenergization of said springs on said other hand in series, and drive means extending operatively between said retarding means and said springs for preventing operative connection of said retarding means and said springs during energization and deenergization of said springs on said one hand in parallel and for operatively connecting said retarding means and said springs during at least deenergization of said springs on said other hand in series, said springs upon deenergization thereof on said one hand in parallel exerting an unregulated returning force on said member and imparting substantial momentum thereto whereupon said member moves beyond its normal position toward said other end position to energize said springs on said other hand in series, said retarding means retarding at least deenergization of said springs on said other hand in series to mitigate against attainment of substantial momentum by said member thus to mitigate the tendency of said member to move beyond its normal potition toward said one end position and to vibrate to opposite sides of its normal position.

7. Means of the character defined comprising mounting means, a member movably mounted on said mounting means for movement between two end positions, at least two springs acting on said member, one of said springs engaging said mounting means and biasing said member to a normal position on said mounting means intermediate said end positions, said member upon movement from its normal position toward one end position acting individually on each of said springs to tension said springs on one hand in parallel, said member upon movement from its normal position toward its other end position acting on the other hand on one of said springs, a carriage movably mounted on said mounting means and connected with said springs, said one spring upon movement of said member from said normal position toward said other end position acting on said carriage and said carriage in turn acting on the other of said springs, whereby said member in its latter movement moves said carriage and tensions said springs on the other hand in series, and retarding means operatively connected with said carriage, said springs upon deenergization on said one hand in parallel exerting a non-retarded returning force on said member and imparting substantial momentum thereto whereupon said member moves beyond its normal position toward said other end position, moves said carriage and tensions said springs on said other hand in series, said springs when tensioned on said other hand in series exerting a returning force on said carriage and said member, said retarding means being actuated by said carriage at least upon returning movement of said carriage to retard at least deenergization of said springs on said other hand in series, thus to mitigate against attainment of substantial momentum by said member and to mitigate the tendency of said member to vibrate to opposite sides of its normal position.

8. Means of the character set forth in claim 7, including one-way clutch means between said retarding means and said carriage accommodating operative association of said retarding means and said carriage solely during returning movement of said carriage to retard deenergization of said springs on said other hand in series, thus to prevent movement of said member back beyond its normal position toward said one end position.

9. Means of the character set forth in claim 7, including drive means positively connecting said carriage and said retarding means, whereby said retarding means retards both energization and deenergization of said springs on said other hand in series.

10. Means of the character defined comprising a housing, a shaft journaled in said housing for oscillation between two end positions, torsion spring means engaging said shaft and said housing and biasing said shaft to a normal position in said housing intermediate said end positions, said shaft, due to its engagement with said spring means, upon rotation from its normal position toward one of said end positions tensioning said spring means on one hand to establish a returning force upon said shaft, said shaft upon rotation from its normal position toward the other of said end positions tensioning said spring means on the other hand to establish an opposite returning force on said shaft, a rotatable mass having substantial inertia journaled in said housing, and drive means extending operatively between said mass and said spring means for preventing operative connection of said mass and said spring means during energization and deenergization of said spring means on said one hand and for operatively connecting said mass and said spring means during at least deenergization of said spring means on said other hand, said spring means upon deenergization on said one hand exerting an unregulated returning force on said shaft and imparting substantial momentum thereto whereupon said shaft rotates beyond its normal position toward said other end position, said drive means connecting said rotatable mass to said spring means at least upon deenergization of said spring means on said other hand, whereby the inertia of said mass retards deenergization of said spring means on said other hand to mitigate against attainment of substantial momentum by said shaft at least upon return of said shaft from said other end position toward its normal position, thereby to mitigate the tendency of said shaft to rotate back beyond its normal position toward said one end position and to oscillate to opposite sides of its normal position.

11. Means of the character set forth in claim 10, said drive means including one-way clutch means between said mass and said spring means accommodating connection of said mass to said spring means only upon deenergization of said spring means on said other hand.

12. Means of the character defined comprising a housing having abutment means therein, a shaft journaled in said housing for oscillation between two end positions, said shaft having crank arm means thereon, torsion spring means on said shaft, said spring means engaging said crank arm means and opposite sides of said abutment means and normally biasing said shaft to a predetermined position in said housing intermediate said end positions, one end of said spring means normally engaging said abutment means to prevent movement of said one end of said spring means in one direction from said position, said abutment means accommodating movement of said one end of said spring means away from said position in the opposite direction, said shaft having carriage means thereon operatively connected to said shaft and engageable with said one end of said spring means upon rotation of said shaft in said opposite direction from said predetermined position to move said one end of said spring means in said opposite direction away from said abutment means, a movable mass having substantial inertia, and drive means operatively connecting said mass to said carriage means at least during movement of said one end of said spring means with respect to said abutment means back toward said position to retard the return of said carriage means and said shaft by said spring means to said predetermined position and to dissipate momentum of said shaft during the return movement thereof.

13. Means of the character defined comprising a housing, a shaft journalled in said housing for oscillation about its own axis between two end positions, a pair of torsion springs operatively associated with said shaft and biasing the same to a normal position intermediate said end positions, abutment means in said housing, the ends of one of said springs normally engaging opposite sides of said abutment means to limit movement of the ends of the one spring in opposite directions, one end of said one spring normally operatively engaging said shaft at one side thereof, a carriage rotatable on said shaft, the ends of the other of said springs normally engaging opposite sides of said carriage and normally operatively engaging said shaft at the opposite sides thereof, said carriage normally engaging the other end of said one spring at the side thereof opposite the said one side of said one end of said one spring operatively to connect said springs in series in one direction of rotation of said carriage, said springs biasing said shaft to a predetermined position with respect to said abutment means, a mass having substantial inertia journalled for rotation in said housing, and drive means operatively connecting said carriage and said mass at least upon rotation of said carriage in one direction.

14. Means of the character defined comprising a housing; a shaft oscillatably mounted in said housing; abutment means in said housing; a first torsion spring on said shaft normally engaging opposite sides of said abutment means at the opposite ends thereof; a first finger fixed to said shaft normally engaging one end of said first spring; a carriage rotatably mounted on said shaft and including a finger normally engaging the opposite end of said first spring; a second torsion spring on said shaft normally engaging opposite sides of said carriage at the opposite ends thereof; a pair of second fingers fixed to said shaft normally engaging, respectively, the opposite ends of said second spring, an inertia mass rotatably mounted in said housing; and drive means connecting said mass to said carriage; said springs engaging said fingers on said shaft and biasing said shaft to a normal position with respect to said abutment means; said mass being disposed in the path of rotation of said carriage and limiting movement of said carriage in opposite directions; said springs normally biasing said carriage to its limit of movement in one direction; the first finger and the corresponding one of the second fingers on said shaft, upon rotation of said shaft in said one direction from its normal position, engaging said one end of said first spring and the corresponding end of said second spring, the opposite ends of said springs being anchored respectively by said abutment means and said carriage, whereby said spring are tensioned in parallel on the one hand; the other one of said second fingers upon rotation of said shaft in the opposite direction from its normal position engaging said opposite end of said second spring, said one end of said second spring engaging said carriage to connect said shaft to said carriage for movement in said opposite direction, said finger on said carriage engaging said opposite end of said first spring and said one end of said first spring being anchored by said abutment means, whereby said first spring is tensioned on the other hand until said carriage reaches its limit of movement in said opposite direction, said second spring upon movement of said shaft in said opposite direction with respect to said carriage being tensioned on said other hand in series with said first spring; said drive means connecting said mass to said carriage at least during rotation of said carriage from said opposite limit of movement to its normal position to retard the movement of said carriage and series release of said springs, thus to mitigate the momentum of said shaft in being returned to its normal position upon series release of said springs.

References Cited in the file of this patent

UNITED STATES PATENTS

| | | |
|---|---|---|
| 639,470 | Troubetzkoy | Dec. 19, 1899 |
| 2,402,400 | Hewitt et al. | June 18, 1946 |
| 2,501,060 | Leibing | Mar. 21, 1950 |

FOREIGN PATENTS

| | | |
|---|---|---|
| 501,679 | Great Britain | Mar. 3, 1939 |
| 700,405 | Great Britain | Dec. 2, 1953 |

UNITED STATES PATENT OFFICE

CERTIFICATE OF CORRECTION

Patent No. 2,816,752                            December 17, 1957

Manfred Stene

It is hereby certified that error appears in the printed specification of the above numbered patent requiring correction and that the said Letters Patent should read as corrected below.

Column 13, line 46, after "move" insert --back--; same line 46, for "potition" read --position--; column 16, line 17, for "spring" read --springs--.

Signed and sealed this 11th day of February 1958.

(SEAL)
Attest:
KARL H. AXLINE

Attesting Officer

ROBERT C. WATSON
Commissioner of Patents